No. 805,235. PATENTED NOV. 21, 1905.
P. SCHMIDT & A. DESGRAZ.
PRODUCER GAS FURNACE.
APPLICATION FILED MAR. 15, 1905.
2 SHEETS—SHEET 1.
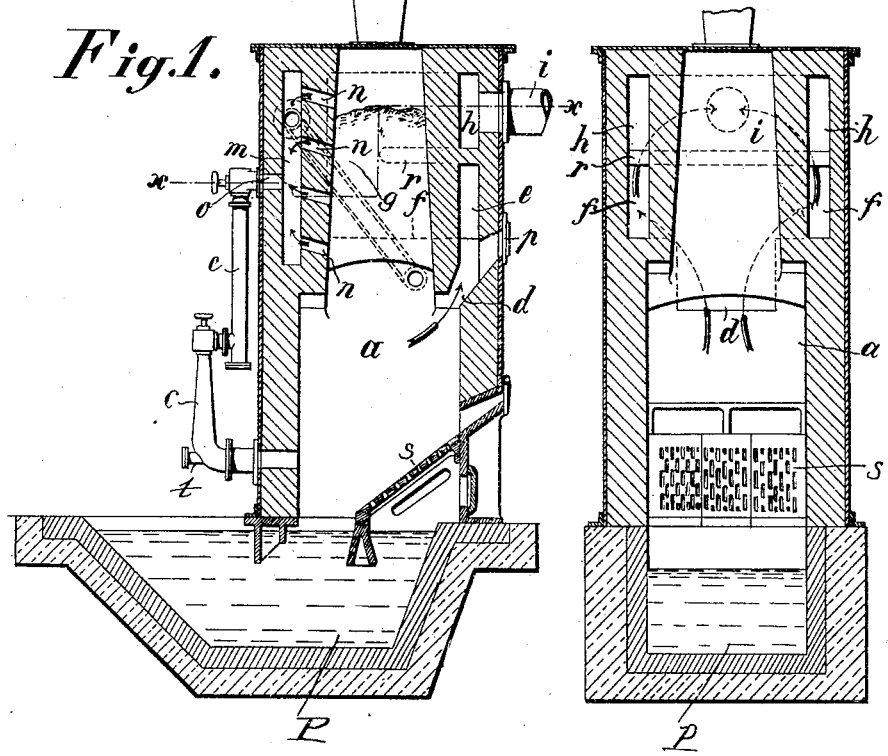

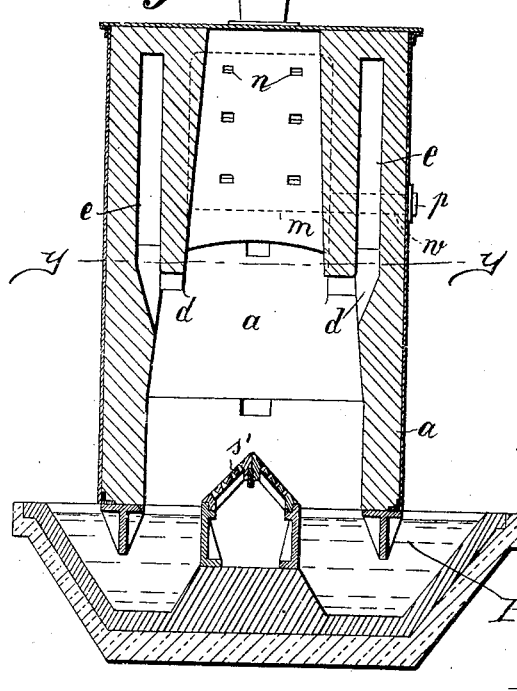
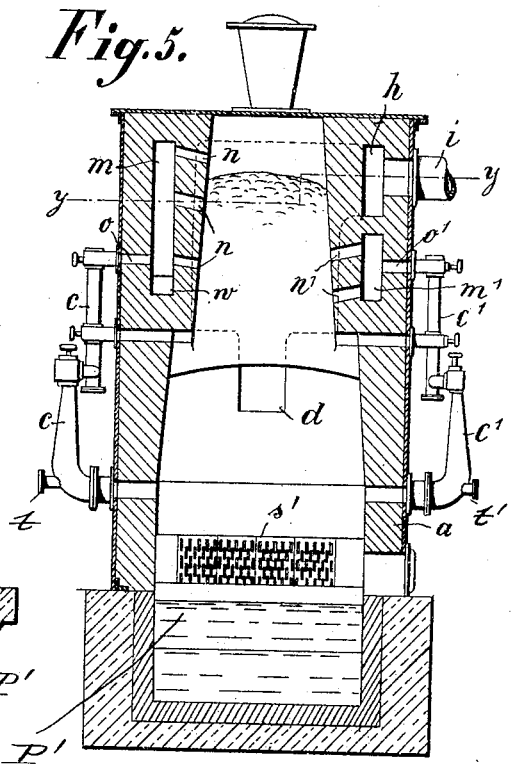
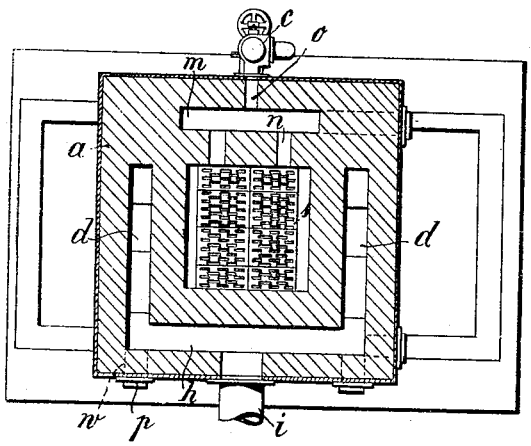

UNITED STATES PATENT OFFICE.

PAUL SCHMIDT AND ADOLPHE DESGRAZ, OF HANOVER, GERMANY.

PRODUCER-GAS FURNACE.

No. 805,235. Specification of Letters Patent. Patented Nov. 21, 1905.

Application filed March 15, 1905. Serial No. 250,277.

*To all whom it may concern:*

Be it known that we, PAUL SCHMIDT and ADOLPHE DESGRAZ, engineers, of La Prinzenstrasse, Hanover, Germany, have invented certain new and useful Improvements in or Relating to Producer-Gas Furnaces, of which the following is a clear and perfect description.

This invention relates to gas-furnaces for use in the manufacture or production of producer, power, and similar gas, and which in the abstracted gases are utilized in the known manner for heating the fresh fuel in the upper portion of the furnace-shaft, while the heavy gases newly generated are drawn off at several points and returned into the combustion zone within the said shaft. In order to obtain with such furnaces gases of a composition as uniform as possible, and also to prevent the tarry products therein contained from being deposited in the return-pipe, the gas according to this invention passes through numerous superimposed apertures in the gas-producing chamber and enters a collecting-chamber arranged close to the gas-producing chamber. All the gas flowing from different parts of the gas-producing chamber becomes uniformly mixed in this collecting-chamber and is, moreover, heated by the previously-accumulated gases and by the walls of said chamber, so that none of its tarry products become deposited in the return feed-pipe. Furthermore, a portion of the dust carried along with the gas is deposited in the collecting-chamber. This manner of treatment of the gas insures that while the gas is returning to the combustion zone of the furnace its quality is always of a uniform character.

Some forms of producer-gas furnaces constructed according to this invention are shown in the accompanying drawings, wherein—

Figure 1 is a vertical section through such a furnace. Fig. 2 is a similar view, but at right angles to Fig. 1. Fig. 3 is a horizontal section taken on the line $xx$ of Fig. 1. Fig. 4 is a vertical section of another form of gas-furnace. Fig. 5 is a vertical section of Fig. 4, taken at right angles thereto. Fig. 6 is a horizontal section taken on the line $yy$ of Fig. 4.

On the four sides and around the upper part of the gas-producer shaft $a$ are formed hollow spaces, chambers, or passages. The distilled gases pass first through the opening $d$ into the upwardly-extending vertical passage $e$, traverse the passage $f$ below the partition $r$, then the passage $h$ above them, and in this way reach the outlet-pipe $i$. The ends of the passages or chambers are provided with cover-plates $p$, adapted to close the apertures $w$, through which the dust that collects may be readily removed. The passages $d\ e\ f\ g\ h$ are so arranged as to surround the upper portion of the shaft $a$ on three of its sides. The fourth side is also provided with a hollow space, forming a chamber $m$, which communicates on one side by means of the passages or openings $n$ with the interior of said shaft, and on the other side is in communication, through the passage $o$, with the pipes $c\ c$, so that the gaseous products are all collected at the points where they were distilled or generated. All the light and heavy and warm and cold gas mix in the chamber $m$ and become purified by allowing the dust to deposit. A gaseous mixture of uniform character is thus supplied to the hottest part of the shaft, for which purpose a steam-injector, as $t$, of the ordinary kind may be employed. Owing to the fact that the dust is previously separated from the gases, all choking of the suction-pipe—a drawback which often causes the entire stoppage of the work—is avoided.

Figs. 4, 5, and 6 refer to a modification in which the gaseous products formed in the upper part of the shaft are not only drawn off from one side, but from two or more sides, by the aid of several exhaust devices and are returned to the lower and hottest zone. Besides the chamber $m$ for the removal of the gaseous products generated in the upper part there is also a second chamber $m'$, from which the heavy gases are drawn off by means of the passages $n'$, the circulating-pipes $c'$, and a separate exhaust device and are again returned to the furnace.

Connected with the pipes $c$ and $c'$ are steam-injectors $t$ and $t'$ for forcing the gases into the zone of combustion of the fuel in the combustion-chamber of the furnace.

The lower end of each type of furnace is controlled by a water seal, (designated in one case by $p$ and in the other by $p'$,) while the furnaces are provided interiorly thereof with grates, as $s$ and $s'$, of the ordinary construction.

Having now particularly described and ascertained the nature of our said invention and in what manner the same is to be performed, we declare that what we claim is—

1. A producer-gas furnace having a collecting-chamber in the wall and in communication with the upper part of the shaft thereof at superposed places, to receive distilled gases from said shaft, and means for drawing the gases from the said chamber and directing them into the zone of combustion of the fuel in the furnace, the wall of the latter being chambered and having a passage opening into said shaft above the point at which said gases are injected into the fuel, said passage serving to receive the gases passed through the fuel and to conduct them into the last-mentioned chambered portion of the furnace, so as to heat the gases in said last-mentioned chambered portion.

2. A producer-gas furnace having a collecting-chamber in the wall and in communication with the upper part of the shaft thereof at superposed places, to receive distilled gases from said shaft, and means for drawing the gases from the chamber above the bottom thereof and for directing such gases into the zone of combustion of the fuel in the furnace, said chamber being in the wall of the furnace and having a removable cover to provide access to said chamber to withdraw the dust therefrom, settling onto the bottom thereof.

3. A producer-gas furnace having a collecting-chamber in communication at superposed places, with the upper part of the shaft thereof, to receive distilled gases from said shaft, and means for drawing gases from the chamber and for directing the same into the zone of combustion of the fuel in the furnace.

In testimony whereof we have hereunto set our hands in presence of two subscribing witnesses.

PAUL SCHMIDT.
     ADOLPHE DESGRAZ.

Witnesses:
 LEONORE RASCH,
 ANNIE DIZZEL.